June 27, 1967 L. O. HEWKO 3,327,566
ACCESSORY DRIVE MECHANISM
Filed Nov. 27, 1964 2 Sheets-Sheet 1
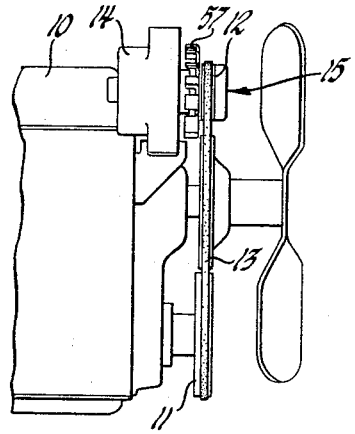
Fig.1
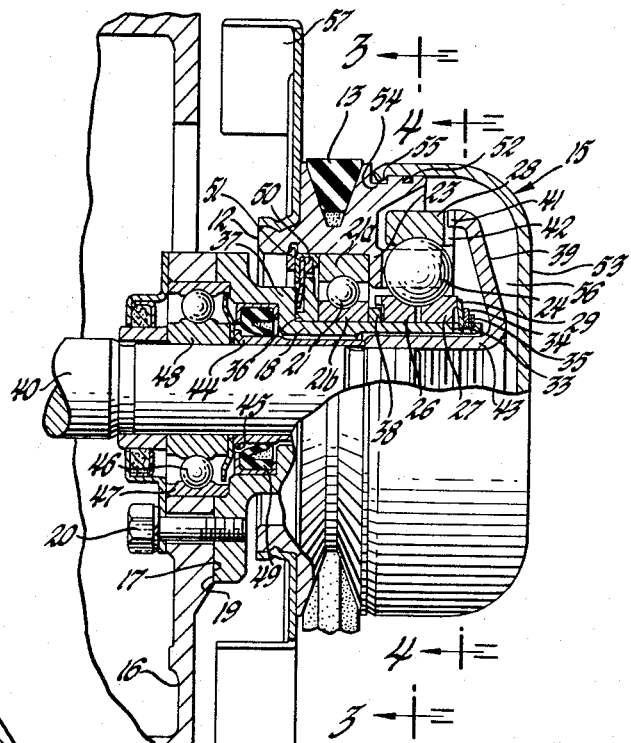
Fig.2
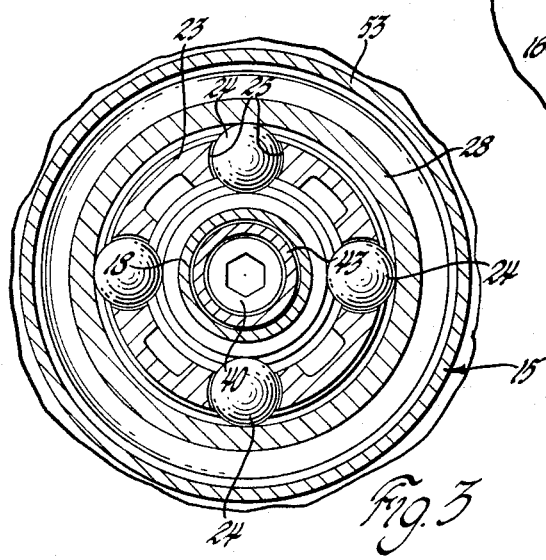
Fig.3
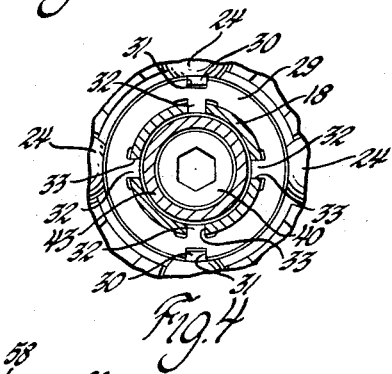
Fig.4
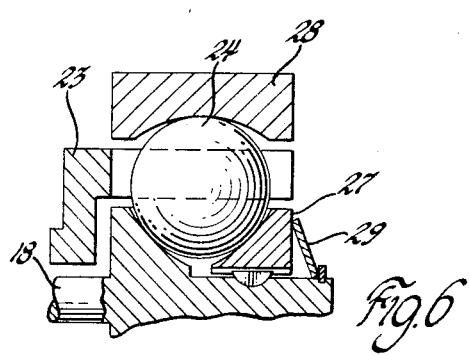
Fig.6
Fig.5
INVENTOR.
Lubomyr O. Hewko
BY
Robert L. Spencer
ATTORNEY June 27, 1967 L. O. HEWKO 3,327,566
ACCESSORY DRIVE MECHANISM
Filed Nov. 27, 1964 2 Sheets-Sheet 2

INVENTOR.
Lubomyr O. Hewko
BY
Robert L. Spencer
ATTORNEY

United States Patent Office 3,327,566
Patented June 27, 1967

3,327,566
ACCESSORY DRIVE MECHANISM
Lubomyr O. Hewko, Warren, Mich., assignor to General Motors Corporation, Detroit, Mich., a corporation of Delaware
Filed Nov. 27, 1964, Ser. No. 414,064
4 Claims. (Cl. 74—798)

This invention relates to an accessory drive mechanism and more particularly to an overdrive structure particularly adapted for driving engine driven accessories such as generators or alternators commonly used on automotive vehicles.

Engine driven accessories such as generators, alternators and air conditioning compressors are normally driven from the vehicle engines by means of belts and pulleys. In such drive arrangements the pulley diameters may be selected to provide overdrive of engine driven accessories with respect to engine speed. However, the practical overdrive ratio obtainable is limited due to the relationship between pulley size and belt life. It is desired to provide an overall step-up ratio between the engine crankshaft and the alternator of 3.6 to 1. This ratio exceeds the practical capabilities of pulley-belt drives in present day automotive vehicles wherein the engines may be operated through a wide speed range, for example, 500 r.p.m. at idle to a maximum speed of 5000 r.p.m. With a simple belt-pulley arrangement selected to provide a 3.6 to 1 overdrive ratio, belt life is very short and inadequate. While step-up gearing might be employed, such gear type step-up units are not suitable due to objectionable noise at the relatively high speeds involved.

The proposed drive structure herein disclosed provides efficient, quiet and vibration-free overdrive of a generator at a step-up ratio of the order of 3.6 to 1 and in addition provides for improvement in normal belt life. In order to increase belt life a portion of the desired ratio step-up is accomplished by a planetary friction drive and a second portion of the step-up is provided by the belt and pulleys. In this manner, normal belt life is increased. For example, a total overdrive ratio of 3.6 to 1 is accomplished by utilizing a 1.6 to 1 step-up planetary traction drive and the remaining 2.25 to 1 step-up is provided by conventional V-belt running on 7.18 inch diameter and 3.18 inch diameter pulleys. With this arrangement, at 500 r.p.m. engine idling speed, the alternator speed is raised from 1150 to 1800 r.p.m. and its output is increased from approximately 9 amps to 29 amps. At 5000 engine r.p.m. the alternator speed is 18,000 r.p.m. which is within its permissible speed limit. It will readily be apparent that with the speeds involved that noise is a very important consideration which eliminates the use of simple step-up gearing.

The proposed friction drive structures herein disclosed are of simple structure, are adapted for use in installations where space requirements are critical, are inexpensive to manufacture, are capable of long useful life, and are quiet in operation.

An object of this invention is to provide an accessory drive for driving the accessories of an engine driven vehicle wherein the accessories are driven at overdrive with respect to engine speed by means including a belt driven friction drive mechanism arranged such that one portion of the final overdrive ratio is obtained by belt drive and driven pulleys and a second portion by means of a friction drive transmission to assure long normal belt life and to provide adequate overall step-up of the accessory speed relative to engine speed to render the accessories more efficient particularly at relatively low engine speeds.

Another object of this invention is to provide a belt driven accessory drive system wherein one of the belt pulleys rotates as a unit with a carrier of a friction drive transmission to drive the carrier and wherein a ball roller driven by the carrier drives a ring output member at overdrive ratio with respect to speed of rotation of the pulley and carrier.

A further object of this invention is to provide an accessory drive mechanism of the type described including a friction drive assembly including a fixed support housing provided with an axially extending non-rotatable support sleeve, an engine driven input member including a carrier, bearing means supporting said input member and carrier for rotation on the external surface of the support sleeve, a rotatable ring, spaced reaction suns on the external surface of the sleeve and fixed against rotation by the sleeve, a ball driven by the carrier and contacting said suns and ring, a final power delivery shaft extending through the hollow ground sleeve and a connector connecting the ring to the final power delivery shaft extending into the fixed support sleeve between the final power delivery shaft and the internal surface of said support sleeve for driving said final power delivery shaft.

An additional object of this invention is to provide an acessory drive mechanism of the type described wherein the friction roller, ring and connector cooperate to support the power delivery shaft to eliminate the need for providing a power delivery shaft bearing in addition to the bearing for supporting the planet carrier.

These and other objects and advantages of this invention will be apparent from the following description and claims, taken in conjunction with the following drawings, in which:

FIGURE 1 is a diagrammatic side view of a vehicle engine equipped with an accessory and belt drive mechanism constructed in accordance with the principles of this invention.

FIGURE 2 is an axial section through the friction roller overdrive mechanism.

FIGURE 3 is a sectional view taken along the line 3—3 of FIGURE 2.

FIGURE 4 is a sectional view taken along the line 4—4 of FIGURE 2.

FIGURE 5 is a side view of an alternate carrier construction which may be substituted for the carrier of FIGURE 3.

FIGURE 6 is a partially sectional view illustrating the contact geometry of the basic drive between the roller and sun and roller and ring as each being of concave profile.

Figure 7:
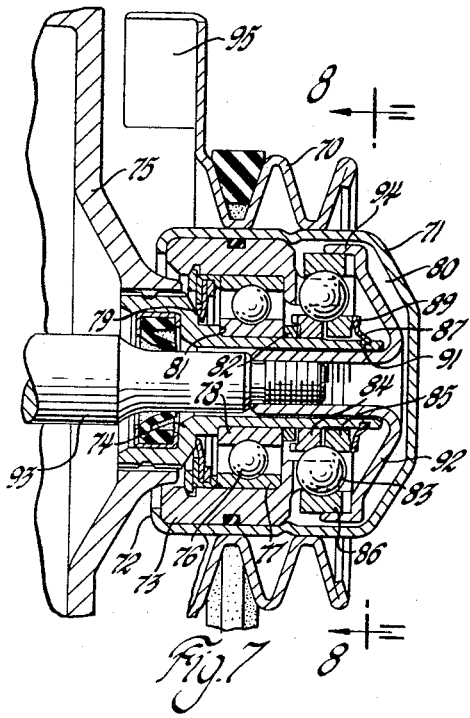
FIGURE 7 is a sectional view of an alternate construction wherein the friction contact roller functions both to drive the ring and as a roller bearing to support the power delivery shaft.

In FIGURE 1 there is shown an engine 10 and an alternator 14. A crankshaft driven pulley 11 drives an alternator pulley 12 by means of a belt 13. As heretofore stated, the pulley diameters are selected to provide a step-up belt drive of 2.25 to 1 in order to maintain the pulley diameters within a range wherein long belt life is possible.

As best shown in FIGURE 2, a ball friction roller drive indicated generally at 15 provides an overdrive ratio of 1.6 to 1 between pulley 12 and an alternator input shaft 40. An alternator support housing 16 is provided with a machined surface 17 to which is attached a reaction shaft 18 provided with a machined surface 19 matching surface 17. Bolts 20 maintain the shaft 18 and housing 16 in assembled relationship. Reaction shaft 18 supports the friction drive, carries the reaction force to housing 16 and supports the belt force. Pulley 12 serves both as the housing for the drive assembly and the carrier for the planetary friction drive and is the power input member for the planetary friction drive. A radial ball bearing 21 disposed between outer and inner races 21a and 21b supports pulley 12 for rotation on reaction shaft 18. Pulley 12 has formed integrally therewith a planet carrier 23 extending axially therefrom to receive four balls or planets 24. As best shown in FIGURE 3, carrier 23 has formed therein hydrodynamic journal bearing surfaces 25 for receiving balls 24. As shown in FIGURE 2, these surfaces 25 are semicircular to conform to the spherical surfaces of the balls. The surfaces 25 may, however, be of other than spherical configuration as hereafter set forth. Rollers 24 contact a pair of spaced suns 26 and 27 and a ring 28. Sun 26 is fixed to reaction shaft 18 so as to be incapable of rotation or axial motion and may be press fitted upon shaft 18. Sun 27 is capable of axial motion but is incapable of rotation with respect to shaft 18. Sun 27 is grounded to reaction shaft 18 by means of a Belleville spring 29.

As best shown in FIGURE 4, a pair of axially extending tangs or ears 30 on sun 27 extend into spaced slots 31 formed in Belleville spring 29. Belleville spring 29 is provided with four tangs or ears 32 which extend into spaced radial slots 33 formed in shaft 18. In this manner, Belleville spring transmits reaction torque from sun 27 to reaction shaft 18. Referring again to FIGURE 2, a spacer 34 disposed between spring 29 and a snap ring 35 serves as a means for producing proper axial deflection of spring 29 when the spring is assembled to shaft 18. The thickness of spacer 34 is chosen to produce adequate normal load and consequently adequate torque capacity of the drive to withstand the maximum expected torque to be transmitted. A spacer 36 disposed between an upstanding flange 37 on shaft 18 and race 22 and a spacer 38 disposed between race 21b and sun 26 insure proper axial alignment of the parts. Ring 28, which is the power delivery member of roller drive assembly is connected to an alternator drive shaft 40 by means of a drive flange 39. Drive flange 39 includes an ear 41 adapted to contact a slot 42 on ring 28 and a threaded cylindrical portion 43 adapted to contact an unthreaded cylindrical sleeve spacer 44 having a radially extending flange 45 formed on the end thereof. A ball bearing 46 is disposed between alternator housing 16, and shaft 40, the race 47 supporting both the reaction shaft 18 and housing 16 and the race 48 contacting power input shaft 40. A shaft seal 49 contacts the outer surface of cylindrical sleeve spacer 44. A face seal 50 is retained adjacent spacer 38 by a snap ring 51 carried by pulley 12. It will be apparent that drive flange 39 is simply and easily assembled to the unit by rotating the flange relative to shaft 40 until flange 45 contacts bearing race 48. A seal 52 is disposed between a cover 53 and pulley 12. Cover 53 is retained upon pulley 12 by means of a bent in rim 54 which extends into an annular groove 55 in pulley 12. When assembled, lubricating oil is disposed in chamber 56 enclosed by the pulley and cover. A fan 57 supported on pulley 12 provides cooling for the alternator.

A stated, suns 26 and 27 are prevented from rotation. The reaction torque is split between suns 26 and 27 with one-half carried by each sun. Belleville spring 29 functions both to transmit the reaction torque from sun 27 to reaction shaft 18 and to axially load the two suns toward each other in order to generate normal loads at the sun-planet and ring-planet contacts. The normal load when multiplied by the coefficient of traction and the radius at which it is acting, produces usable torque forces whereby ring 28 is driven. Semicircular openings or surfaces 25 are machined in the carrier 23 and constitute journal surfaces for the ball planets 24. The balls, while rotating about their own centerline, generate a hydrodynamic film of oil between their outside surfaces and the carrier surface 25 capable of supporting the tangential torque force with a minimum of wear and power losses.

As heretofore stated, the surfaces 25 of carrier 23 are semicircular in shape and are machined on the carrier. The shape of these surfaces may be modified and may consist of inserts rather than being machined on the carrier itself. In FIGURE 5, carrier 23 is shown as having notches 58 formed therein and adapted to receive bearing inserts 59. Inserts 59 are provided with spherical surfaces 60 which conform more closely to the outer spherical surface of the ball planets 24 and produce better hydrodynamic load capacity. Here a spherical partial hydrodynamic bearing is generated by machining a spherical seat 60 inside the insert 59. As indicated by the arrows, the radius of the seat is larger than the radius of the ball planet. This geometry generates a wedge action between the ball planet and the seat 60. When oil is trapped in the wedge portion it tends to lift the ball with a relatively high force. The contact geometry of the basic drive is best shown in FIGURE 6 wherein the sun rolling surface and ring rolling surface are both concave. However, it is possible to use straight or convex rolling surfaces, if advantageous. The ring rolling surface illustrated as of concave profile might be of straight cylindrical shape.

In operation, pulley 12 is driven by V-belt 13 from crankshaft pulley 11 of FIGURE 1 and at a speed greater than crankshaft speed. In order to preserve belt life, the step-up provided by the pulleys is of the order of 2.25 to one. Carrier 23 driven at the speed of rotation of pulley 12 applies a torque force to the ball planets 24 through the partial journal bearing surfaces 25. Suns 26, 27 being fixed to reaction shaft 18 form the reaction surface for ball planets 24, causing the balls to rotate about the suns. This, in turn, causes ring 28 to rotate at an increased speed and in the same direction as pulley 12. Ring 39 drives the alternator input shaft 40 at a ratio of 1.6 times the speed of rotation of pulley 12, such that the shaft 18 is driven at a speed 3.6 times that of pulley 11.

In FIGURE 7 there is shown a simplified roller friction drive assembly of more compact nature than those heretofore described. In this figure a double pulley 70 is welded to a cover 71, the cover 71 having bent over tabs 72 for gripping the planet carrier 73. A reaction shaft 74 splined to alternator housing 75 carries a roller bearing 76 having an outer race 77 contacting carrier 73 and an inner race 78 contacting reaction shaft 74. A seal 79 prevents leakage of oil from a chamber 80 enclosed by cover 71. Race 78 contacts a shoulder 81 on shaft 74 and a spacer 82. Six ball planet rollers 83 contact spaced suns 84 and 85 and a ring 86. Sun 84 is press fitted on reaction shaft 74 and sun 85 is connected to reaction shaft 74 by means of Belleville spring 87.

Figure 8:
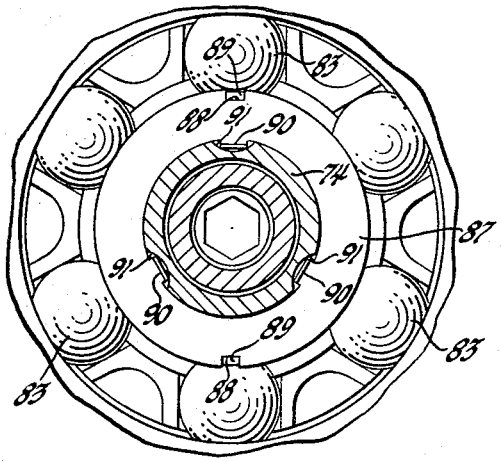
FIGURE 8 is a sectional view taken along the line 8—8 of FIGURE 7.

As best seen in FIGURE 8, Belleville spring 87 is provided with spaced notches 88 adapted to receive ears 89 on sun 85 (shown in FIGURE 7) and has bent over tangs 90 disposed in semispherical seats 91 formed in reaction shaft 74.

The operation is the same as that previously described but the structure is more compact. Belleville spring 87 is of simplified construction and the design eliminates the spacer 34 and snap ring 35 of FIGURE 2. Belleville spring 87 is simply snapped into place on shaft 74 and requires no additional means of axial or torsional fastening. Another improvement consists in the elimination of the principal alternator bearing 46 of FIGURE 2. In the FIGURE 7 embodiments the friction drive is further modified so as to function as a radial support for the alternator power input shaft 93. This is accomplished by providing a pilot diameter 94 between the output flange 92 and the outer diameter of friction drive ring 86. When flange 92 is threaded upon power delivery shaft 93, the annular axially extending boss portion or pilot diameter 94 on flange 92 mates with the outer surface of ring 86 such that the planetary rollers 83 support one end of shaft 93 through suns 84, 85 and reaction shaft 74. Deletion of the conventional alternator bearing 46 of FIGURE 2 results in considerable cost saving and structural simplification. Belt forces are transmitted to housing 75 through reaction shaft 74. In the embodiment of FIGURE 7, six planet balls 83 may be employed if desired. Further, in FIGURE 7, a fan 95 is driven by pulley 70. Fan 95 may be disposed within housing 75 and driven by shaft 93 rather than by the pulley 70. Such an arrangement is advantageous in that the fan would then rotate at the output speed of the friction drive unit rather than its input speed.

It has heretofore been explained that the contact profiles of the carrier may be modified to different shapes. In addition the contact arrangements may be varied as shown in FIGURES 9 through 12.

Figure 9:
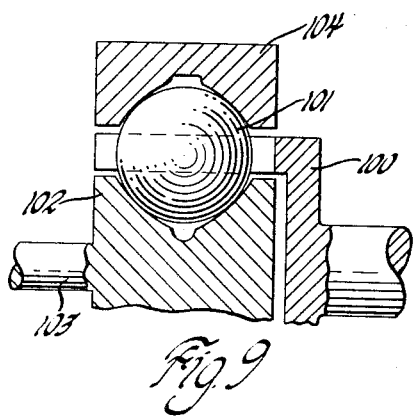
FIGURE 9 is a sectional view of an alternate friction drive arrangement wherein two contacts are provided between the planet and sun and between the planet and ring.

In FIGURE 9 a power input carrier 100 causes ball planets 101 to travel around sun 102 fixed to reaction shaft 103 to drive ring 104. In this arrangement there are provided two contacts between the ball planet 101 and sun 102 and two contacts between ball planet 101 and ring 104. This arrangement increases the axial stiffness of the drive. The required normal load between the rolling bodies is generated by interference fit between the three rolling bodies. The flexibility of the various members is effectively utilized as a loading spring.

Figure 10:
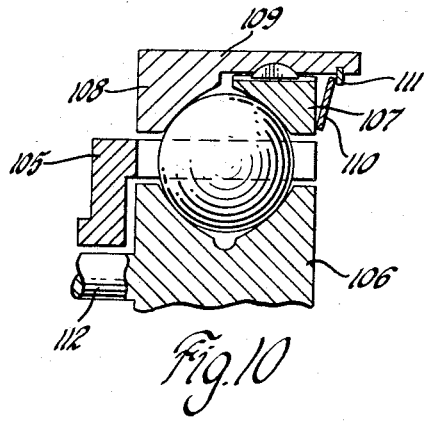
FIGURE 10 is a partially sectional view of an arrangement similar to FIGURE 9 in that it provides four rolling contacts per planet and in addition illustrates the ring split into two halves with the normal load applied by a suitable axial spring.

FIGURE 10 shows an additional arrangement having four rolling contacts per planet. Herein the ring 109 is divided into two halves 107 and 108 with the ring portion 107 keyed to portion 109 for axial movement with respect thereto. A Belleville spring 110 seated upon a snap ring 111 provides proper normal loading of the rolling members. Sun 106 is prevented from rotation by a reaction shaft 112. Carrier 105 is the input and ring 109 the power delivery member. This design does not depend upon dimensional interference fit for loading, but uses the separate, preferably flat rate spring 110.

Figure 11:
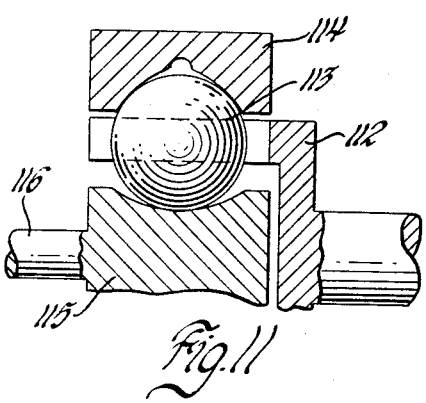
FIGURE 11 is a partially sectional view of an arrangement wherein the ring has two contacts and the sun a single contact with the planet.

FIGURE 11 shows a further contact arrangement wherein the ball planet 113 has two contacts with ring 114 and a single contact with sun 115. The normal loading of the rolling bodies is again accomplished by interference fit using the elasticity of the rolling elements as a spring. Sun 115 is held against rotation by a reaction shaft 116, carrier 112 is input, and ring 114 the output of the assembly.

Figure 12:
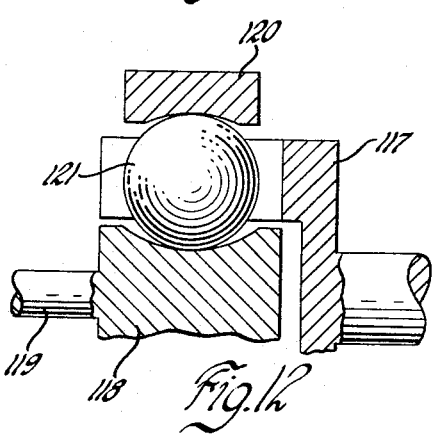
FIGURE 12 is a partially sectional view wherein there is only a single contact between the planet and sun and planet and ring and the geometry very closely resembles a radial ball bearing.

In FIGURE 12 there is only one contact between the ball planet 121 and sun 118 and one contact between the ball 121 and ring 120. The geometry closely resembles a radial ball bearing. Here, again, the normal load in the contact is generated by dimensional interference of the rolling members. Sun 118 is held against rotation by reaction shaft 119, carrier 117 is the input, and ring 120 the output of the unit.

It will readily be understood that the carriers of FIGURES 9 through 12 will be belt driven and the rings connected to an alternator input shaft (not shown) as described in FIGURES 2 and 7.

Depending upon applications, each of the suggested arrangements has its own advantages. The fixed preload or interference preload arrangements are best suited for drive applications where the drive is required to operate at predominantly constant load. The spring preload arrangement having split sun or split ring is best suited where dimensional accuracy cannot be maintained, thus providing the required contact normal loads with relatively liberal manufacturing tolerance.

There has thus been provided a simple compact and inexpensive overdrive assembly particularly designed for driving an alternator of the type commonly used in automotive vehicles. The axial load required to transmit the peak torque of 36 inch pounds is relatively low, resulting in small loss of efficiency and long useful life. The drive provides a normal step-up of alternator speed which is quiet and vibration-free at all speeds due to the uninterrupted action of the rolling contacts and the continuous balance of all radial and axial force vectors between rolling bodies. In addition to displaying an absence of exciting forces, the traction drives behave dynamically as a stiff viscous damper. This characteristic is of great benefit in applications containing objectionable natural vibration frequencies within their operating speed range, since the need for vibration dampeners is eliminated. The application is ideal for engine driven alternators where quiet operation is essential and belt life is preserved by reducing the step-up provided by the belt and by supplying a portion of the step-up through the friction drive assembly.

What is claimed is:

1. Power transmitting mechanism comprising a non-rotatable housing, a hollow sleeve shaft fixed to said housing, a power input carrier, a bearing supporting said carrier on said sleeve shaft for rotation with respect to said shaft, a first sun carried by said shaft and fixed against movement with respect to said shaft, a second sun carried by said shaft and axially movable with respect thereto, means connecting said second sun to said sleeve shaft comprising a Belleville washer, said washer preventing rotation of said second sun and effective to bias said second sun axially toward said first sun, a ring spaced from said suns, said carrier extending into the space between said suns and ring, spaced surfaces on said carrier for receiving ball rollers, a torque transmitting ball disposed in the space between each of said spaced surfaces of said carrier and in nonslipping friction engagement with said ring and suns, a power delivery shaft extending through said hollow sleeve shaft, a bearing between said housing and power delivery shaft, means connecting said ring to said power delivery shaft, said torque transmitting balls also providing a bearing support for said power delivery shaft.

2. Power transmitting mechanism comprising a housing fixed against rotation, a hollow sleeve support shaft extending outwardly from said housing and fixed thereto, a power input planet carrier, a bearing rotatably supporting said carrier on said sleeve shaft, a first sun supported upon said sleeve shaft in fixed relationship with respect thereto, a second sun supported on said sleeve shaft and movable with respect thereto, a ring spaced from said suns, an extension on said carrier extending into the space between said ring and suns, a plurality of ball receiving pockets on said extension, a ball in each of said pockets, means for biasing said second sun axially with respect to said sleeve shaft to maintain said balls in nonslipping friction contact with said ring and suns comprising a Belleville washer, said washer having one portion thereof fixed to said sleeve shaft and a second portion fixed to said second sun for preventing rotation of said sun with respect to said sleeve shaft, a power delivery shaft extending through said sleeve shaft, and means connecting said power delivery shaft to said ring, said balls providing a support for rotatably supporting said power delivery shaft in said sleeve shaft.

3. Power transmitting mechanism comprising a housing fixed against rotation, a hollow sleeve support shaft fixed to said housing, a power input planet carrier, bearing means between said carrier and support shaft supporting said carrier for rotation with respect to said support shaft, a first sun supported on said support shaft and fixed against rotation with respect to said shaft, a second sun supported upon said support shaft and axially movable with respect thereto, a ring spaced from said suns, an extension on said carrier disposed in the space between said ring and suns, a series of spaced pockets formed on said extension, a ball roller disposed in each of said pockets and contacting said ring and said suns, an axially extending ear on said second sun, a notch on said support shaft, means for biasing said second sun axially toward said first sun to maintain said balls in nonslipping friction contact with said ring and said suns comprising a Belleville spring washer, a notch in said Belleville washer for receiving said ear, a tang on said washer extending into said support shaft notch, and means connecting said power delivery shaft to said ring for rotation therewith, said balls providing a support for rotatably supporting said power delivery shaft in said support shaft.

4. An accessory drive for driving the accessories of an engine driven vehicle comprising a support housing, a support sleeve fixed to said housing, an engine driven planet carrier, a planet roller driven by said carrier, a reaction sun supported on said support sleeve, a bearing between said carrier and support sleeve, a ring, said planet roller being in friction contact with said sun and ring, a final power delivery shaft connected to drive an engine accessory and having one end extending into said support sleeve, and means for supporting said one end of said final power delivery shaft and for driving said power delivery shaft comprising a connection between said ring and power delivery shaft, said planet roller being effective to drive said ring and to support said ring and connection to thereby support said one end of said power delivery shaft.

References Cited

UNITED STATES PATENTS

| | | | |
|---|---|---|---|
| 1,399,442 | 12/1921 | Rennerfelt | 74—798 |
| 1,574,803 | 3/1926 | Erban | 74—798 |
| 1,585,140 | 5/1926 | Erban | 74—798 |
| 2,828,907 | 4/1958 | Oehrli | 74—796 |
| 2,874,592 | 2/1959 | Oehrli | 74—796 |
| 2,905,026 | 9/1959 | Oehrli | 74—796 |
| 2,913,932 | 11/1959 | Oehrli | 74—796 |
| 2,953,039 | 9/1960 | McRae | 74—798 |

FOREIGN PATENTS 313,969   6/1930   Great Britain.

DONLEY J. STOCKING, *Primary Examiner.*

THOMAS C. PERRY, DAVID J. WILLIAMOWSKY,
*Examiners.*